United States Patent [19]
Kim et al.

[11] Patent Number: 5,846,511
[45] Date of Patent: Dec. 8, 1998

[54] PROCESS FOR PREPARING CRYSTALLINE TITANIA POWDERS FROM A SOLUTION OF TITANIUM SALT IN A MIXED SOLVENT OF WATER AND ALCOHOL

[75] Inventors: Chong Hee Kim; Do Kyung Kim, both of Taejeon; Young Tae Moon, Pusan; Hong Kyu Park, Taejeon, all of Rep. of Korea

[73] Assignee: Korea Advanced Institute of Science and Technology, Taejeon, Rep. of Korea

[21] Appl. No.: 665,812

[22] Filed: Jun. 19, 1996

[30] Foreign Application Priority Data

Jun. 19, 1995 [KR] Rep. of Korea ...................... 95 16237

[51] Int. Cl.[6] .................................................. C01G 23/047
[52] U.S. Cl. .......................... 423/610; 423/611; 423/612; 423/615
[58] Field of Search .................................... 423/610, 611, 423/612, 615

[56] References Cited

PUBLICATIONS

"Preparation of Uniform Colloidal Dispersions by Chemical Reactions in Aerosols", M. Visca et al, *Journal of Colloid and Interface Science*, vol. 68, No. 2, pp. 308–319, 1979.

"Effects of Thermal Pretreatment on Coarsening of Nominally Monodispersed Titania", L. H. Edelson et al, *Communications of the American Ceramic Society*, pp, C–198 – C–201, Apr., 1988.

"Nucleation and Growth of Monosized $TiO_2$ Powders from Alcohol Solution", J.H. Jean et al, *Langmuir*, vol. 2, pp. 251–255, 1986.

"Preparation and Mechanism of Formation of Titanium Dioxide Hydrosols of Narrow Size Distribution", E. Matijević et al, *Journal of Colloid and Interface Science*, vol. 61, No. 2, pp. 302–311, 1977.

"Alkoxide–Derived Titania Particles: Use of Electrolytes to Control Size and Agglomeration Levels", J. L. Look et al, *J. Am. Ceram. Soc.*, vol. 75, No. 6, pp. 1587–1595, 1992.

"Growth Mechanism of Hydrous Chromium(III) Oxide Spherical Particles of Narrow Size Distribution", A. Bell et al, *The Journal of Physical Chem.*, vol. 78, No. 25, pp. 2621–2625, 1974.

"$TiO_2$ Produced by Vapor–Phase Oxygenolysis of $TiCl_4$", Y. Suyama et al, *Journal of the American Ceramic Society*, vol. 59, No. 3–4, pp. 146–149, 1976.

"Kinetics of Titanium Dioxide Precipitation by Thermal Hydrolysis", E. Santacesaria et al, *Journal of Colloid and Interface Science*, vol. 111, No. 1, pp. 44–53, 1986.

"Metal Oxocations", J. Selbin, *Journal of Chemical Education*, vol. 41, No. 2, pp. 86–92, 1964.

"Preparation of Spherical Titania Particles from Inorganic Precursor by Homogeneous Precipitation", A. Kato et al, *Met. Res. Soc. Symp. Proc.*, vol. 155, pp. 13–22, 1989.

"High–Purity, Monodisperse $TiO_2$ Powders by Hydrolysis of Titanium Tetraethoxide. 1. Synthesis and Physical Properties", E. A. Barringer et al, *Langmuir*, vol. 1, No. 4, pp. 414–428, 1985.

"Effect of Solvent on the Homogeneous Precipitation of Titania by Titanium Ethoxide Hydrolysis", M. T. Harris et al, *Journal of Non–Crystalline Solids*, vol. 103, pp. 49–64, 1988.

*Primary Examiner*—Paul Marcantoni
*Attorney, Agent, or Firm*—Burns, Doane, Swecker & Mathis, L.L.P.

[57] ABSTRACT

The process for preparing crystalline titania powders is provided. The process comprises dissolving titanium salt in a mixed solvent of water and alcohol, heating the resulting solution to 15°~75° C. to form titanium hydroxide precipitates, and crystallizing the titanium hydroxide precipitates.

8 Claims, 8 Drawing Sheets

PROCESS FOR PREPARING CRYSTALLINE TITANIA POWDERS FROM A SOLUTION OF TITANIUM SALT IN A MIXED SOLVENT OF WATER AND ALCOHOL

BACKGROUND OF THE INVENTION

1. Field of the Invention

The present invention relates to a process for preparing crystalline titania($TiO_2$) powder. More particularly, it relates to a process for preparing crystalline titania powder without milling by using titanium salt as a starting material and a mixture of water and alcohol as a solvent and controlling the shape, size, size distribution and the like of precipitated particles.

2. Description of the Prior Art

Inorganic compounds such as titania, zinc oxide, lead oxide, etc. have been widely used as materials for white pigments which have excellent light scattering effects and light screening power. Of these, rutile-type titania has been most widely used since it has a high refractive index, oil adsorptivity, colouring power, and chemical stability under a strong acidic or basic atmosphere, etc., as shown in Table 1 below. In addition to use as pigments, titania has also been used as a coating material, photoconductors-photocatalysts, etc. since it has an excellent whiteness and is easily subject to oxidation/reduction.

A sulfate process or chloride process has been usually used to prepare titania powder.

The sulfate process comprises dissolving ilmenite ($FeOTiO_2$) in aqueous sulfuric acid, hydrolyzing the resulting solution at a temperature above 95° C. to form amorphous titanium hydroxide ($TiO_2 \cdot xH_2O$), calcining the titanium hydroxide at a temperature of 800° to 1000° C., and milling the titanium hydroxide to form the desired phase of titania.

TABLE 1

|  | $TiO_2$ | | | |
|---|---|---|---|---|
|  | Anatase | Rutile | ZnO | PbO |
| Crystal system | tetragonal | tetragonal | hexagonal | — |
| Gravity | 3.9 | 4.2 | 5.5–5.7 | 6.8–6.9 |
| Refractive index | 2.52 | 2.71 | 2.03 | 2.09 |
| Hardness | 6–7 | 5.5–6 | — | — |
| Relative colouring power | 1300 | 1700 | 300 | 100 |
| Infrared absorption (%; at 360 nm) | 67 | 90 | 93 | — |
| Reflectance (%) | | | | |
| 400 nm | 88–90 | 47–50 | 80–82 | 75–78 |
| 500 nm | 94–95 | 95–96 | 93–94 | 90–91 |
| Dielectric constant | 31 | 114 | — | — |
| Melting point | phase transition | 1858 | — | — |
| Chemical stability | | | | |
| HCl | insoluble | insoluble | soluble | soluble |
| NaOH | insoluble | insoluble | soluble | soluble |

However, many problems are caused when titania powders are prepared by the sulfate process. For example, many impurities are entrained when the calcined titanium hydroxide precipitates are milled. Due to such contamination, properties of the final products are greatly deteriorated. Further, in the milling process, it is impossible to control properties of the particles, such as particle shape, size, size distribution, etc. Therefore, the milled particles have irregular shapes and various sizes, resulting in the deterioration of the density of the molded article. Furthermore, the elevated temperature required during the calcination process causes an increase in the cost of production. Use of a strong acid such as sulfric acid brings about the problems of environmental pollution. The reaction conditions requiring a high temperature and use of a strong acid cause severe corrosion of the equipments.

A chloride process developed by Du Pont comprises reacting a natural rutile ore or synthetic rutile (90% purity) with HCl gas at a higher temperature to form titanium tetrachloride, and reacting the resulting product with $O_2$ gas to form titania powders. According to this chloride process, rutile-type titania powders are prepared in more than 99.9% purity. However, the process has disadvantages that the shape, size and size distribution of the particles cannot be easily controlled. In addition, the process has a limited practical use because the natural rutile ores are localized in the restricted area.

The properties of ceramic products greatly depend on those of the starting powders. Therefore, extensive studies have been made to control the properties of raw powders such as its particle shape, size, size distribution, etc.

Recently, many studies have been made to prepare titania powders of spherical, uniform-sized particles using titanium alkoxide in order to solve the problems of environmental pollution and improve the dispersibility of the powders.

E. Matijevic, et al. "Preparation and Mechanism of Titanium Dioxide Hydrosols of Narrow Size Distribution," J. Colloid and Interface Sci., 61(2), 302–311, 1977, discloses a process for preparing titania powders of spherical particles comprising aging a solution of titanium tetrachloride in water containing hydrochloric acid and sodium sulfate for 37 days at 95° C. The particles have a uniform size of about 1.5 μm. As either the aging time or the amount of sodium sulfate is increased, the particle size is also increased.

E. A. Barringer, et al., "High-Purity, Monodispersed $TiO_2$ Powders by Hydrosols of Titanium Tetraethoxide," Lamgmuir, 1(4), 414–420, 1985, discloses a process for preparing titania powders of uniform-sized particles comprising dissolving titanium alkoxide in ethanol, and hydrolyzing and condensing the resulting solution by adding $H_2O$. The particles have an average particle size of 0.3 to 0.6 μm. The hydrolysis and condensation are controlled by the amount of water to be added. According to the process, the adjustment of pH of the solution is required to control the particle shape, size, and size distribution.

Sol-gel processes using alkoxides have an advantage in that the powders of spherical, fine, uniform-sized particles are provided. However, according to the processes, strict control of the reaction conditions is required because hydrolysis occurs violently even in air. Further, the processes have not yet been commercialized because the starting alkoxides are expensive. Therefore, the processes have heretofore been carried out on a laboratory scale.

Therefore, there is need of a simplified process for preparing titania powders without environmental pollution problems at a more economical cost.

SUMMARY OF THE INVENTION

The object of the invention is to provide an improved process for preparing fine, uniform-sized, crystalline titania powders with the controlled particle shape, size and size distribution, which can avoid the environmental pollution problems and eliminate a milling step.

The above object of the invention is accomplished by using a titanium salt such as titanium sulfate and titanium chloride as a starting material and a mixture of water and alcohol as a solvent.

DETAILED DESCRIPTION OF THE INVENTION

Figure 1A:
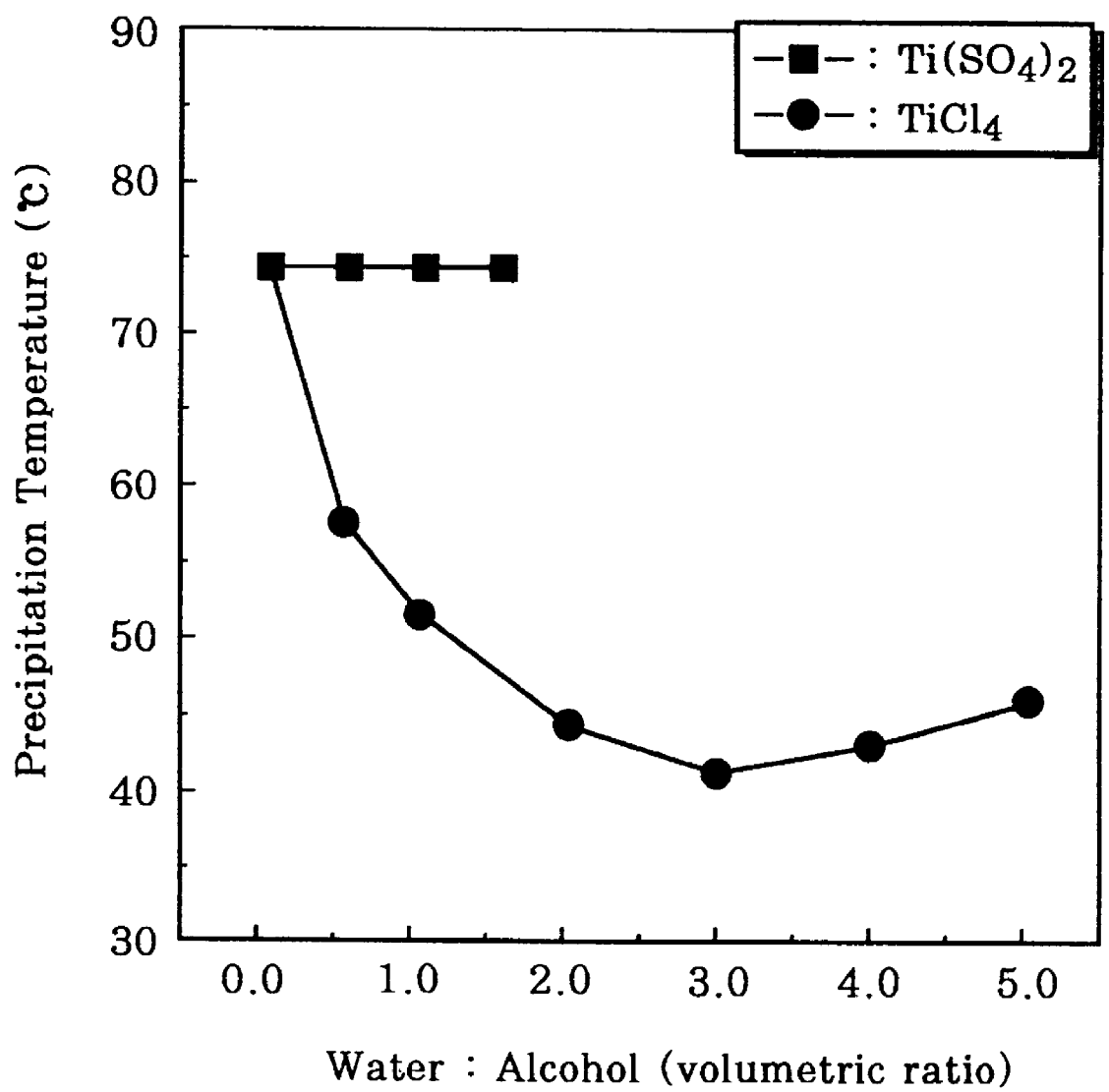
FIGS. 1A and 1B graphically show a change in the precipitation temperature with a mixed ratio of water to alcohol.

The present invention provides a process for preparing crystalline titania powders, which comprises the steps of:

dissolving a titanium salt in a mixed solvent of water and an alcohol;

heating the resulting solution to a temperature of 15° to 75° C. to form titanium hydroxide precipitates; and crystallizing the titanium hydroxide precipitates.

More particularly, the present invention provides a process for preparing anatase-phase titania powders comprising the steps of:

(a) providing a solution of titanium salt in a mixed solvent of water and an alcohol;

(b) heating the resulting solution to a temperature of about 15° to 75° C. to form amorphous precipitates of titanium hydroxide; and (c) hydrothermally crystallizing the resulting amorphous precipitates of titanium hydroxide at 150° to 200° C. under 1 to 10 atm.

In addition, the present invention provides a process for preparing rutile-phase titania powders comprising the steps of:

(a) providing a solution of titanium salt in a mixed solvent of water and an alcohol;

(b) heating the resulting solution to a temperature of about 15° to 75° C. to form amorphous precipitates of titanium hydroxide; and (c) calcining the resulting amorphous precipitates of titanium hydroxide for 1 hr at a temperature of 600° to 800° C.

The titanium salts which can be used as the starting material in the present invention include titanium chloride, oxychloride, sulfate, and oxysulfate. Particularly, titanium tetrachloride, titanium oxychloride, titanium disulfate or titanium oxysulfate are preferred.

The alcohols used in the present invention include a lower alcohol having 1 to 4 carbon atoms such as ethanol, 1-propanol, 2-propanol, 3-butanol and the like. A mixed ratio of water to an alcohol in the mixed solvent is in a range of about 1:0 to about 1:5. The ratio is very important in controlling the precipitation temperature and the properties of the precipitated particles.

Then, the solution of titanium salt in a mixed solvent of water and an alcohol is heated to a certain temperature to form titanium hydroxide precipitates. The precipitation temperature varies depending on the mixed ratio of water to an alcohol and on the type of the alcohol.

When titanium chloride or oxychloride is used as a starting titanium salt, the precipitates are formed at a temperature of about 75° C. when only water is used as a solvent, i.e., when the mixed ratio of water to alcohol is 1:0. With increasing the mixed ratio of water to the alcohol up to about 1:3, the precipitation temperature is gradually lowered to about 45° C. When the mixed ratio of water to the alcohol exceeds 1:3, the precipitation temperature is again increased.

When titanium sulfate is used as a starting material, the precipitates are formed at a temperature of about 75° C. either when only water is used as a solvent or when water and an alcohol are mixed at various ratios. Namely, little change in precipitation temperature occurs depending on a change in the mixed ratio of water to alcohol.

When titanium oxysulfate is used, the precipitates are formed at about 75° C. when only water is used as a solvent. The precipitation temperature is gradually decreased with increasing the mixed ratio of water to alcohol up to 1;1. Then, the precipitation tempertature is kept substantially constant when the mixed ratio of water to alcohol exceeds 1:1.

The precipitation temperature varies with the types of alcohols to be used.

When titanium chloride or oxychloride is used as a starting titanium salt, the precipitation occurs at a temperature of about 75° C. with a mixed solvent of water and ethanol. When a mixed solvent of water and 3-butanol is used, the precipitation temperature is gradually lowered to 15° C. with increasing the mixed ratio of water to 3-butanol up to about 1:5. When a mixed solvent of water and propanol is used, the precipitation temperature is gradually lowered to about 40° C. with increasing a mixed ratio of water to propanol up to about 1:3. When the mixed ratio of water to propanol exceeds 1:3, the precipitation temperature is again increased.

When titanium sulfate or oxysulfate is used as a starting titanium salt, the precipitates are formed in a mixed solvent of water and propanol. However, no or little precipitates are formed when a mixture of water and ethanol or butanol is used as the solvent.

According to the process, the properties of the precipitated particles such as the particle shape, size and size distribution may be controlled depending on the mixed ratio of water to an alcohol.

When titanium sulfate or oxysulfate is used as a starting titanium salt, the precipitated particles do not take any particular shape at a mixed ratio of water to an alcohol of about 1:0. The precipitated particles are gradually changed into a spherical shape with increasing the mixed ratio. At a ratio of water to an alcohol of about 1:0.5, the precipitated particles take a substantially spherical shape. With increasing the ratio of water to an alcohol up to about 1:1, completely spherical, uniform-sized particles are precipitated. At a mixed ratio of water to an alcohol exceeding about 1:1.0, the precipitated particles are out of spherical shape. When the mixed ratio of water to an alcohol exceeds about 1:1.5, no or little precipitates are formed.

When titanium chloride or oxycholride is used as a starting titanium salt, the precipitated particles do not take any particular shape at a mixed ratio of water to an alcohol of about 1:0. With increasing the ratio, the precipitated particles are gradually changed into spherical shape. At a mixed ratio of about 1:0.5, the precipitated particles take a substantially spherical shape. At a mixed ratio exceeding about 1:5, the precipitated particles are of a completely spherical shape. Therefore, when titanium chloride or oxychloride is dissolved in a mixed solvent having a mixed ratio of water to an alcohol of no less than about 1:1, the precipitation temperature varies depending on the types of the alcohol used, but the shape of the precipitated particles are spherical.

Formation of the precipitates according to the invention may be affected by a heating rate. The size and size distribution of the precipitated particles are decreased with increasing the heating rate.

According to the invention, the size of the precipitated particles is increased with increasing the concentration of the titanium salt to be used. In this case, agglomeration of the particles may occur if the concentration of the titanium salt is either less than 0.1M or above 0.3M. Therefore, for the purpose of the invention, the preferred concentration of the titanium salt is in a range of about 0.1M to about 0.3M in order to obtain titania powders having non-agglomerated, uniform-sized particles.

The increased reaction time at a precipitation temperature may increase the amount of the particles to be precipitated.

When titanium sulfate or oxysulfate is used as a starting titanium salt, the amount of the precipitates is gradually increased with increasing the reaction time. However, when titanium chloride or oxychloride is used as a starting titanium salt, the amount of the precipitates is increased for 20 mimutes after the beginning of precipitation, but thereafter, the amount is kept substantially constant.

The precipitated titanium hydroxide particles according to the invention have a uniform size of 0.5 to 1 $\mu$m and take a spherical shape. Analysis by X-ray diffraction showed that the precipitated particles were of a cubic crystalline system.

If the titanium hydroxide precipitates are subject to hydrothermal crystallization under the conditions of high temperature of 150° to 200° C. and high pressure of 1 to 10 atm, anatase-type titania powders are obtained. Alternatively, if the titanium hydroxide precipitates are calcined in a conventional manner for several hours in a furnace at a temperature of 600° to 800° C., rutile-type crystalline titania powders are obtained. The particles of rutile-type titania powders have the same shape and a reduced particle size as compared with those before calcination.

According to the present invention, the phase transition of anatase-phase at a lower temperature into rutile-phase at a higher temperature occurs at a relatively low temperature, for example, at 600° to 800° C. The range of the temperature is still lower than 800° to 1000° C. for the conventional processes.

According to the present invention, no milling step which is essential to the conventional processes is required because the shape, size and size distribution of the precipitated particles can be controlled when the precipitation occurs. Therefore, it is possible to avoid contamination problems due to the impurities which may be produced during the milling step. According to the present invention, the precipitation occurs within a shorter time at a lower temperature of 15° to 75° C. than a temperature of 95° C. in the conventional processes. In addition, the present invention does not require a reaction with oxygen gas, and may be continuously carried out. Therefore, the present invention is more simplified and requires more reduced costs as compared with the conventional processes. Furthermore, the process according to the invention does not require the adjustment of pH of the reaction solution to control the shape, size and size distribution of the particles, unlike the conventional alkoxide processes.

DESCRIPTION OF THE PREFERRED EMBODIMENTS

The present invention will be described in detail with reference to the following examples; however, these examples are intended to illustrate the invention and are not to be construed to limit the scope of the invention.

EXAMPLE 1

Titanium disulfate was dissolved in a mixed solvent of water and 1-propanol at various volumetric ratios of 1:0, 1:0.5, 1:1.0, and 1:1.5 to prepare four 0.1M solutions. Titanium tetrachloride was dissolved in a mixed solvent of water and propanol at various volumetric ratios of 1:0, 1:1, 1:2, 1:3, 1:4 and 1:5 to prepare six 0.1M solutions. While heating each of the solutions at a constant rate of 2° C./min, the temperature at which precipitation occurs was observed.

Similarly, 0.1M titanium tetrachloride solutions, 0.1M titanium oxychloride solutions, and 0.1M titanium oxysulfate solutions were prepared in the same manner as above. The temperature at which precipitation occurs was observed in each solution.

Figure 1B:
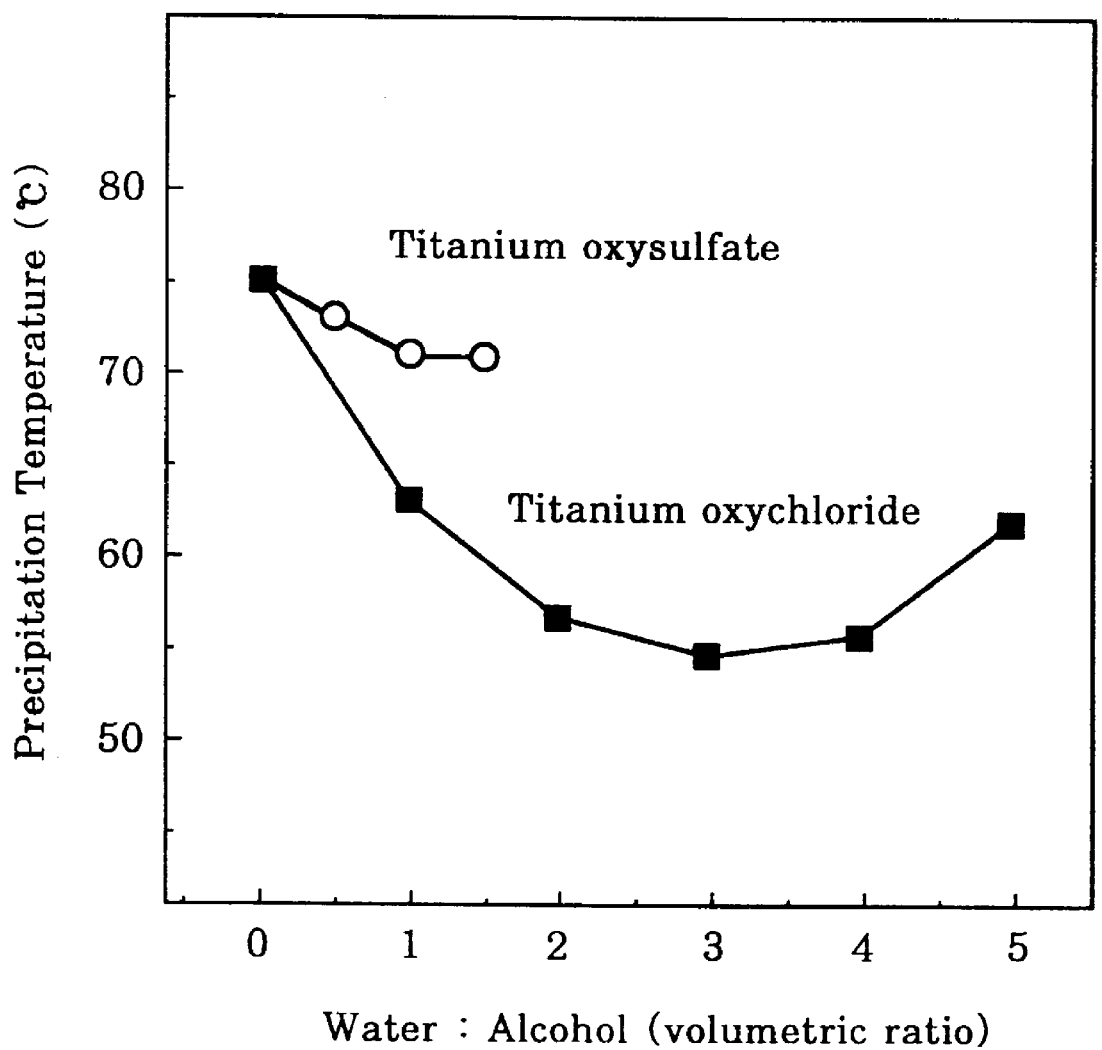
Figure 2A:
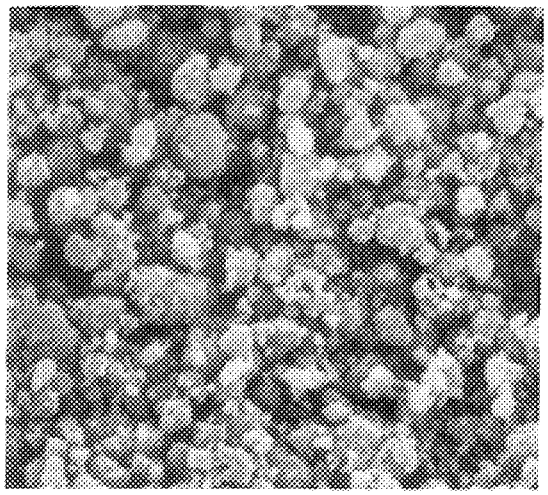
FIG. 2 is an enlarged photograph showing a change in the shape of precipitated particles with a mixed ratio of water to alcohol when titanium (oxy)sulfate is used as a starting titanium salt.
Figure 2B:
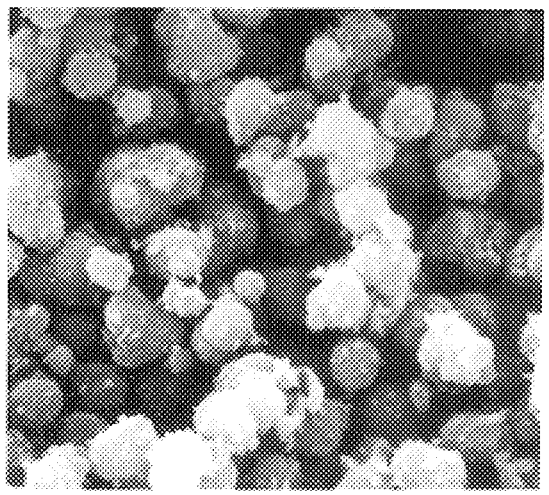
Figure 2C:
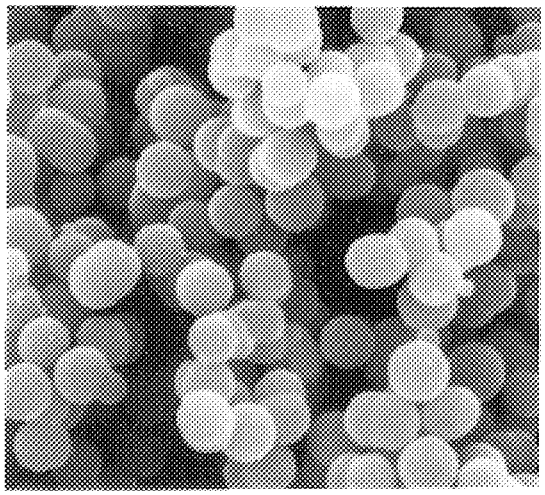
Figure 2D:
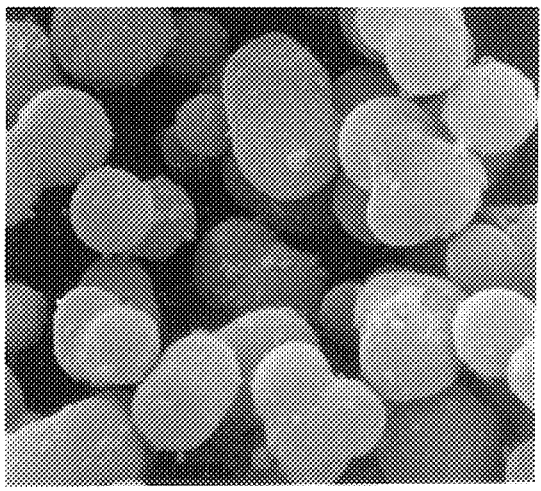
Figure 3A:
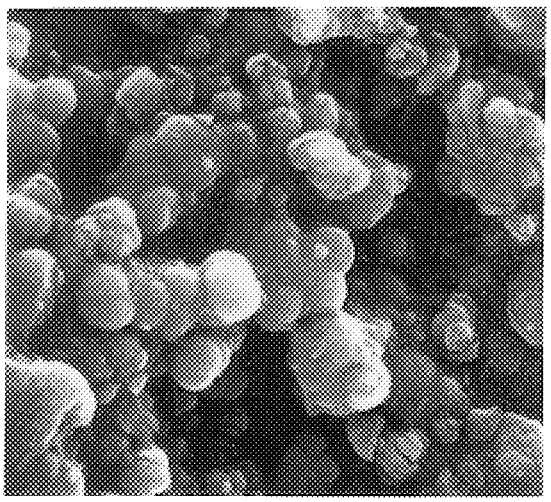
FIG. 3 is an enlarged photograph showing a change in the shape of precipitated particles with a mixed ratio of water to alcohol when titanium (oxy)chloride is used as a starting titanium salt.
Figure 3B:
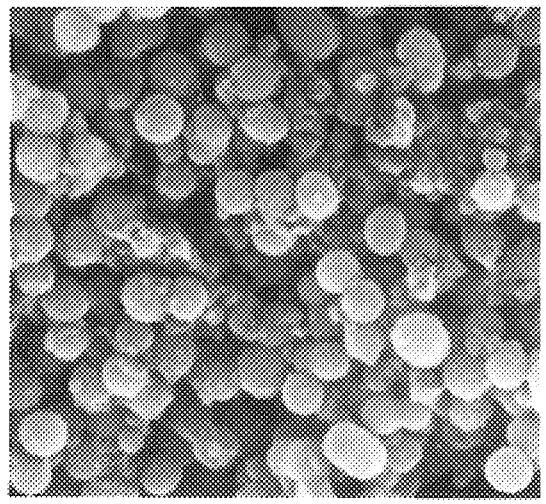
Figure 3C:
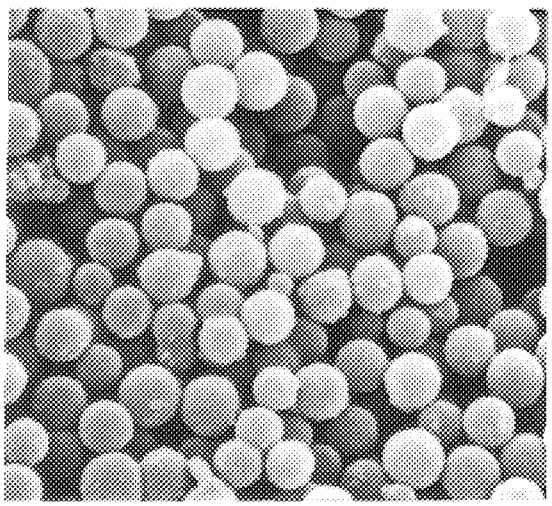
Figure 3D:
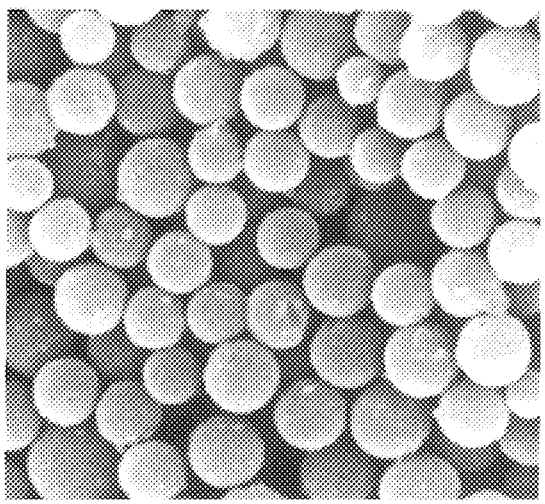

The results are shown in FIGS. 1A and 1B. For titanium disulfate, the precipitates were formed at 75° C. when 1-propanol was not added. The precipitation temperature was kept constant even when the amount of 1-propanol to be added was increased. For titanium tetrachloride, the precipitates were formed at 75° C. when 1-propanol was not added. The precipitation temperatures were gradually decreased to 40° C. with increasing the ratio of water to 1-propanol up to 1:3. When the ratio of water to 1-propanol was above 1:3, the precipitation temperature was again increased.

For titanium oxysulfate, the precipitates were formed at about 75° C. when 1-propanol was not added. With increasing the ratio of water to 1-propanol up to 1:1, the precipitation temperature were gradually decreased to 70° C. When the ratio of water to 1-propanol was above 1:1, the precipitation temperature was constantly kept at about 70° C. For titanium oxychloride, the precipitates were formed at about 75° C. when 1-propanol was not added. With increasing the ratio of water to 1-propanol up to 1:3, the precipitation temperatures were gradually decreased to 40° C. When the ratio of water to 1-propanol was above 1:3, the precipitation temperature was again increased.

EXAMPLE 2

The effect of a mixed ratio of water to alcohol was observed on a change in particle shape.

Titanium disulfate was dissolved in a mixed solvent of water and 1-propanol at various volumetric ratios of 1:0, 1:0.5, 1:1 and 1:1.5 to make four 0.1M solutions. When the solutions were heated at a constant rate of 2° C./min, the precipitated particles were formed. The photomicrographs of the precipitated particles are shown in FIG. 2. In FIG. 2, (a), (b), (c) and (d) shows the photomicrographs when the ratios of water to 1-propanol are 1:0, 1:0.5, 1:1 and 1:1.5, respectively. As shown from the photomicrographs, the precipitated particles did not take particular shapes when the ratio of water to 1-propanol was 1:0. Substantially spherical shaped particles were obtained when the ratio of water to 1-propanol was 1:0.5. Uniform-sized, spherical shaped particles were formed when the ratio of water to 1-propanol was about 1:1. However, when the ratio of water to 1-propanol was about 1:1.5, the precipitated particles did not take completely spherical shapes.

Similarly, 0.1M titanium tetrachloride solutions were prepared and the shapes of the precipitated particles were observed in the same manner as above. The photomicrographs of the precipitates are shown in FIG. 3. In FIG. 3, (a), (b), (c) and (d) show the photomicrographs when the ratios of water to 1-propanol are 1:0, 1:0.5, 1:1 and 1:1.5, respectively. As shown from the phtomicrographs, the precipitated particles did not take particular shapes when the ratio of water to 1-propanol was 1:0. Substantially spherical shaped particles were obtained when the ratio of water to 1-propanol was about 1:0.5. When the ratio of water to 1-propanol was above 1:1, uniform-sized, spherical shaped particles were formed.

EXAMPLE 3

Figure 4:
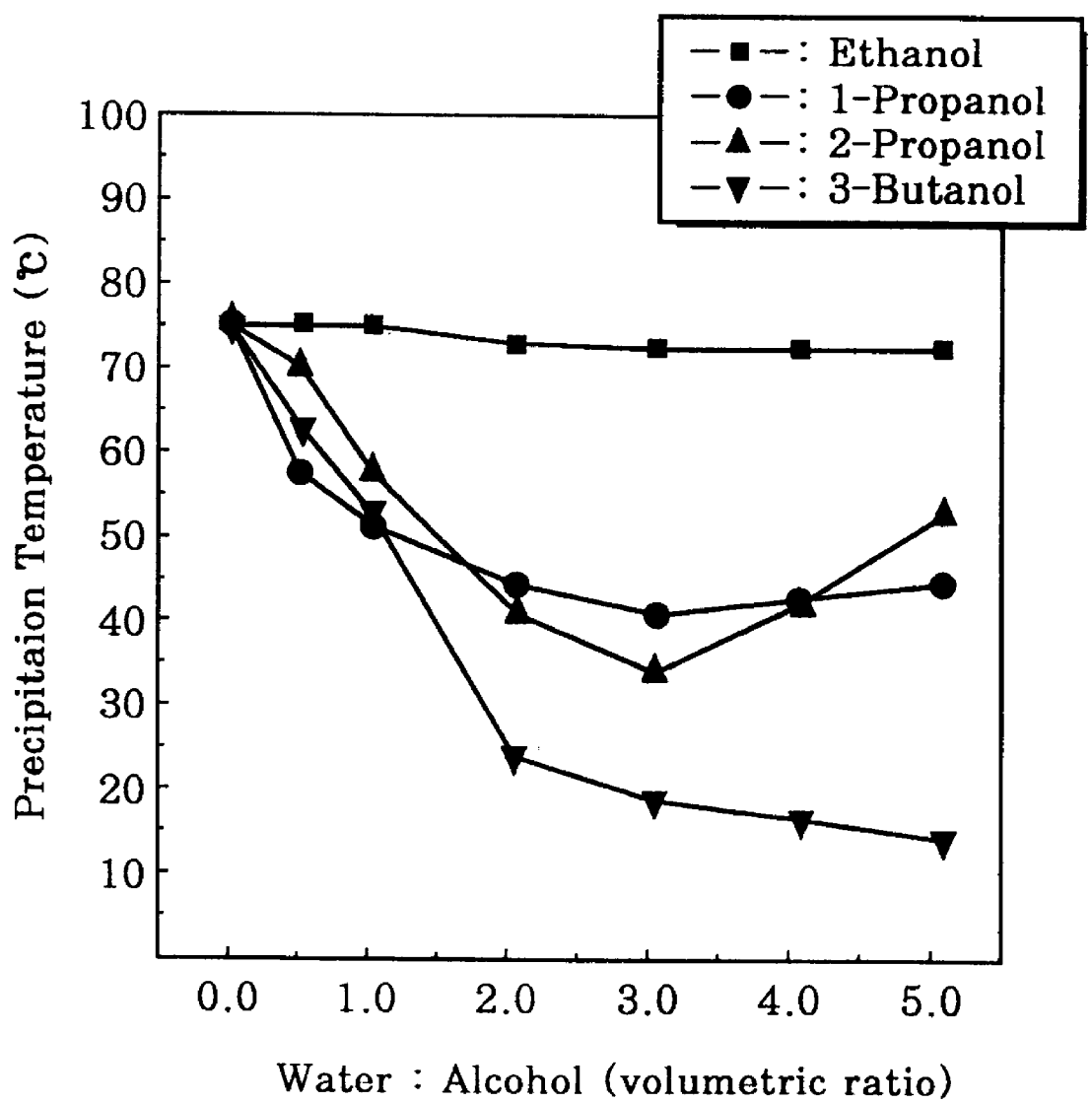
FIG. 4 graphically shows a change in the precipitation temperature with a kind of alcohol when titanium tetrachloride is used as a starting material.

Titanium tetrachloride was dissolved in a mixed solvent of water and ethanol at various volumetric ratios of 1:0, 1:1, 1:2, 1:3, 1:4 and 1:5 to prepare six 0.1M solutions. While heating the solutions at a constant rate of 2° C./min, the temperature at which precipitation occurs was observed. As shown from FIG. 4, the precipitation temperature was constantly kept at about 75° C.

Similarly, 0.1M titanium tetrachloride solutions were prepared and the precipitation temperature was observed in the same manner as above, except that a mixed solvent of water and 2-propanol was used. As shown from FIG. 4, the precipitation temperature was gradually decreased to about 35° C. with increasing the ratio of water to 2-propanol up to 1:3. When the ratio of water to 2-propanol was above 1:3, the precipitation temperature was again increased.

Similarly, 0.1M titanium tetrachloride solutions were prepared and the precipitation temperature was observed in the same manner as above, except that a mixed solvent of water and 3-butanol was used. As shown from FIG. 4, the precipitation temperature was gradually decreased to about 15° C. with increasing the ratio of water to 2-propanol up to 1:5.

The effect of various alcohols was observed on a change in precipitation temperature in the same manner as above, except that titanium disulfate was used. As a result, no precipitates were formed when a mixture of water and ethanol or 3-butanol was used as a solvent. However, when a mixed solvent of water and 2-propanol was used, the precipitation temperature was constantly kept at about 75° C., regardless of the mixed ratio of water to 2-propanol.

EXAMPLE 4

Titanium tetrachloride was dissolved in a mixture of water and 1-propanol at a ratio of 1:1 to make five 0.1M solutions. Similarly, four 0.1M titanium disulfate solutions were prepared in the same manner. The resulting solutions were heated at a rate of 2° C./min, 10° C./min, 20° C./min, 40° C./min, and 70° C./min. The obtained precipitates were observed. The results are shown in Table 2 below.

TABLE 2

| Heating rate | Shape | | Average diameter(μm) | | Size distribution | |
|---|---|---|---|---|---|---|
| (°C./min) | TiCl$_4$ | Ti(SO$_4$)$_2$ | TiCl$_4$ | Ti(SO$_4$)$_2$ | TiCl$_4$ | Ti(SO$_4$)$_2$ |
| 2 | sphere | sphere | 3.2 | 4.0 | 3.5 | 3.5 |
| 10 | sphere | sphere | 1.3 | 1.5 | 2.0 | 1.3 |
| 20 | sphere | sphere | 0.8 | 1.0 | 1.6 | 1.2 |
| 40 | sphere | sphere | 0.7 | 1.0 | 1.5 | 1.15 |
| 70 | sphere | sphere | 0.6 | 0.8 | 1.2 | 1.15 |

As shown from the above table, the shapes of the particles are constantly kept spherical, regardless of the heating rate. The average diameter and size distribution of the particles decreased with increasing the heating rate.

Figure 5:
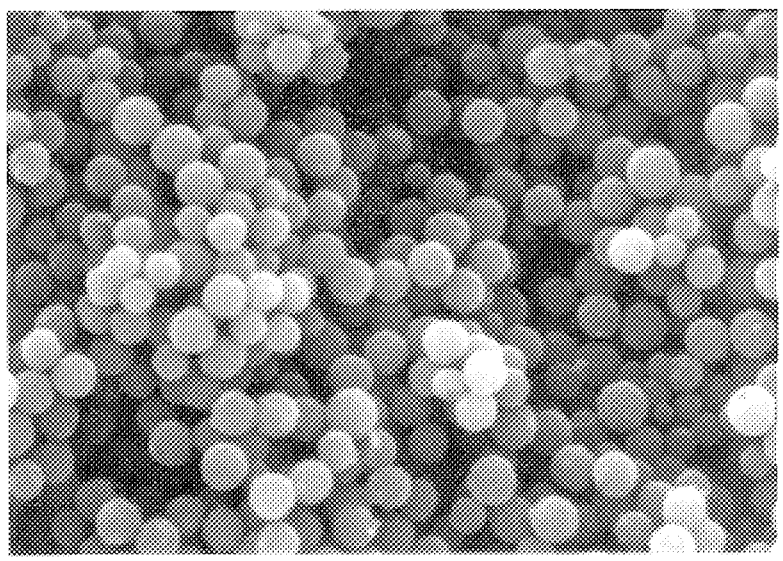
FIG. 5 is an enlarged photograph of precipitated particles which are formed by heating a solution of titanium tetrachloride in a mixed solvent of water and 1-propanol by microwave.

Separately, a 0.1M titanium tetrachloride solution in a mixture of water and 1-propanol was prepared and heated by microwave. The resulting precipitates were observed. The photomicrograph of the precipitated particles is shown in FIG. 5. As shown from FIG. 5, the average diameter and size distribution are greatly decreased as compared with the photomicrograph (c) in FIG. 2.

EXAMPLE 5

Titanium tetrachloride was dissolved in a mixed solvent of water and 1-propanol to make various concentrations of solutions. The solutions were separately heated at a rate of 40° C./min. The resulting precipitates were observed. With increasing the concentrations, the size of the precipitated particles was increased and tends to agglomerate. The results are shown in Table 3 below.

TABLE 3

| Concentration (M) | Average diameter (μm) | Shape |
|---|---|---|
| 0.05 | 0.4 | sphere, agglomerated |
| 0.1 | 0.7 | sphere, dispersed |
| 0.2 | 0.75 | sphere, dispersed |
| 0.3 | 0.75 | sphere, dispersed |
| 0.4 | 0.9 | sphere, agglomerated |
| 0.5 | 1.2 | sphere, agglomerated |
| 0.7 | 2.0 | irregular, agglomerated |
| 1.0 | 3.0 | irregular, agglomerated |

As shown from Table 3, the powders of non-agglomerated, uniform-sized particles are obtained in a concentration of 0.1M to 0.3M.

EXAMPLE 6

Figure 6:
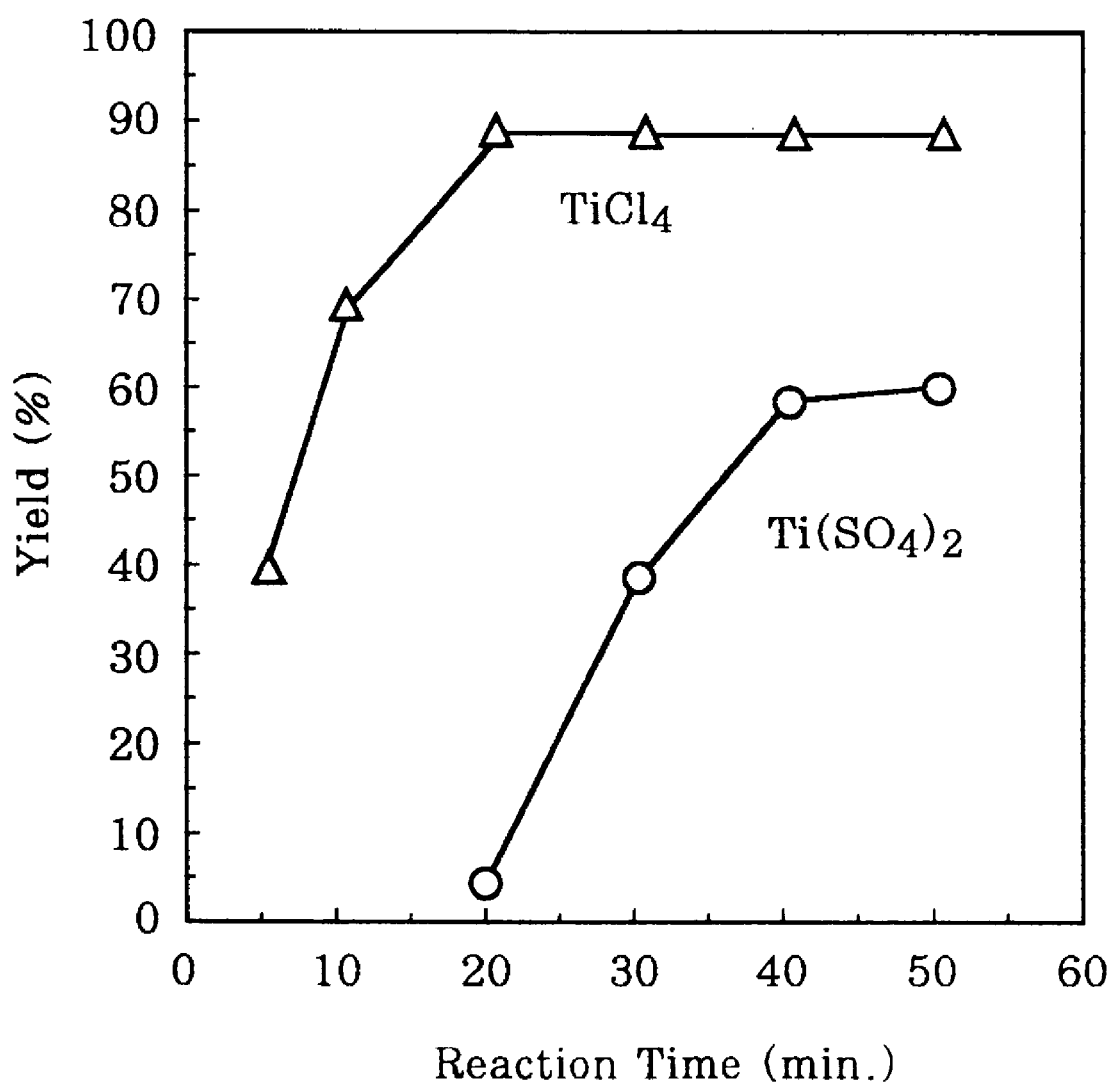
FIG. 6 graphically shows a change in an amount of precipitates with reaction time.

Titanium tetrachloride was dissolved in a mixed solvent of water and 1-propanol to make a 0.1M solution. Similarly, a 0.1M titanium disulfate solution was prepared. The solutions were separately heated at a rate of 40° C./min. A change in the amounts of the resulting precipitates was observed with increasing the reaction time. The results are shown in FIG. 6.

EXAMPLE 7

Figure 7A:
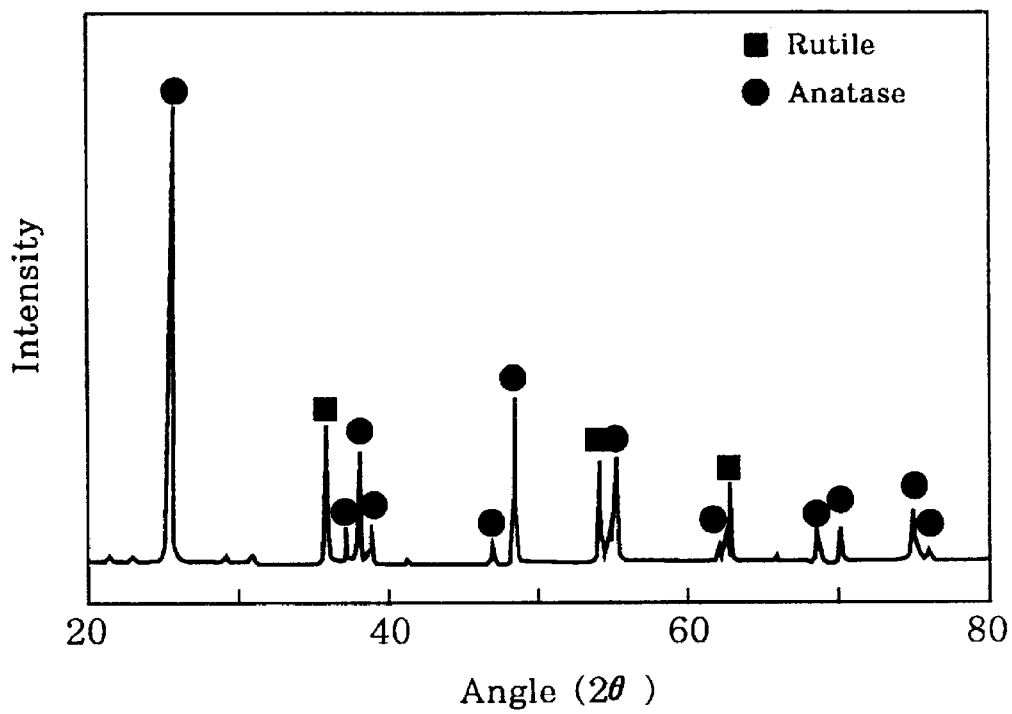
FIGS. 7A and 7B are X-ray spectra of crystalline titania products which are obtained by hydrothermal crystallization and calcination, respectively, from amorphous titanium hydroxide.

Titanium disulfate was dissolved in a mixed solvent of water and 1-propanol to make a 0.1M solution. The resulting solution was heated at a rate of 40° C./min. Then, the resulting titanium hydroxide precipitations were subjected to hydrothermal crystallization at 180° C. under 10 atm. An X-ray spectrography analysis shows that the product is an anatase-phase crystal. The result are shown in FIG. 7A.

Figure 7B:
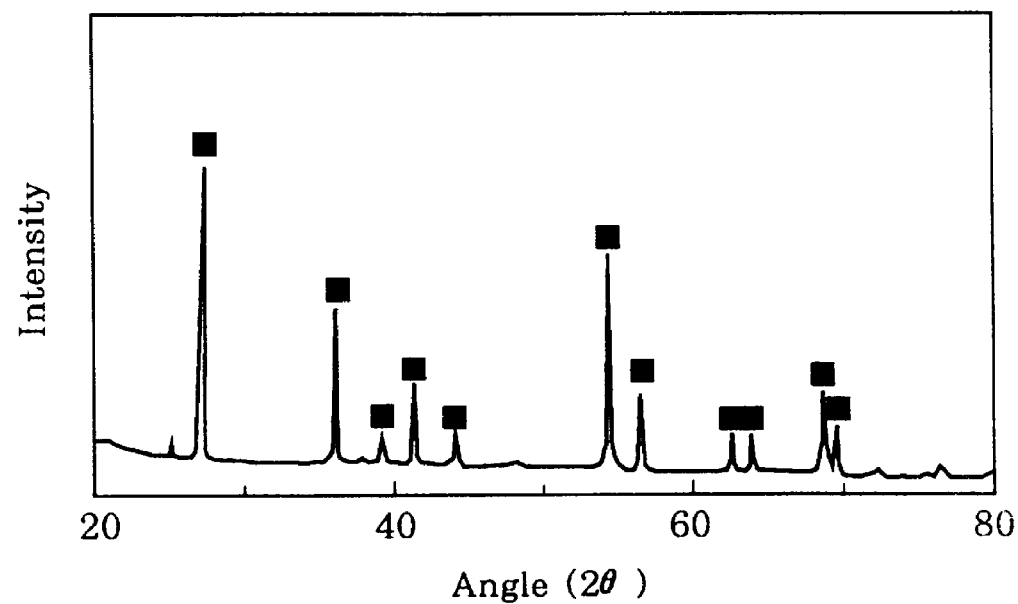

A 0.1M titanium disulfate solution was prepared and heated in the same manner as above. The resulting precipitates were calcined for 2 hrs in air in a furnace at 800° C. An X-ray spectrography analysis shows that the product is a rutile-phase crystal. The results are shown in FIG. 7B.

What is claimed is:

1. A process for preparing anatase-phase titania powders comprising the steps of:
    (a) providing a solution of a titanium salt selected from the group consisting of titanium chloride, titanium oxychloride, titanium sulfate and titanium oxysulfate, in a mixed solvent of water and lower alcohol having 1 to 4 carbon atoms, wherein the water to alcohol ratio is from 1:>0 to about 1:5 (v/v);
    (b) heating the resulting solution to a temperature of about 15° to 75° C. to form amorphous precipitates of titanium hydroxide; and
    (c) hydrothermally crystallizing the resulting precipitates at 150° to 200° C. under a pressure of 1 to 10 atm.

2. A process for preparing rutile-phase titania powders comprising the steps of:
    (a) providing a solution of a titanium salt selected from the group consisting of titanium chloride, titanium oxychloride, titanium sulfate and titanium oxysulfate, in a mixed solvent of water and lower alcohol having 1 to 4 carbon atoms, wherein the water to alcohol ratio is from 1:>0 to about 1:5 (v/v);
    (b) heating the resulting solution to a temperature of about 15° to 75° C. to form amorphous precipitates of titanium hydroxide; and
    (c) calcining the resulting precipitates of titanium hydroxide for 1 hr at 600° to 800° C.

3. The process according to claim 1 or 2, wherein the titanium salt is titanium sulfate or titanium oxysulfate, and the mixed ratio of water to alcohol in the mixed solvent is about 1:0.5 to 1:1.5.

4. The process according to claim 1 or 2, wherein the titanium salt is titanium chloride or titanium oxychloride, and the mixed ratio of water to alcohol in the mixed solvent is about 1:0.5 to 1:5.0.

5. The process according to claim 1 or 2, wherein the solution of titanium salt has a concentration of about 0.1 to about 0.3M.

6. The process according to claim 3, wherein the alcohol is propanol.

7. The process according to claim 4, wherein the alcohol is propanol.

8. The process according to claim 1 or 2, wherein the rapid heating is carried out with microwaves.

* * * * *